(No Model.)
G. O. DRAPER.
BICYCLE.
No. 490,844. Patented Jan. 31, 1893.
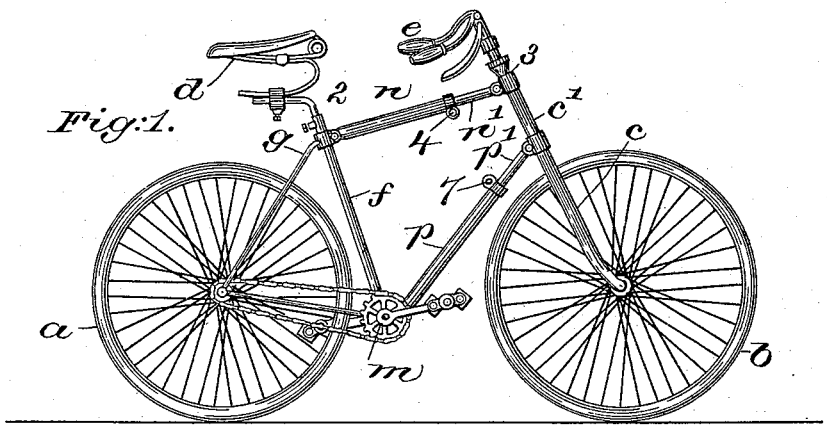
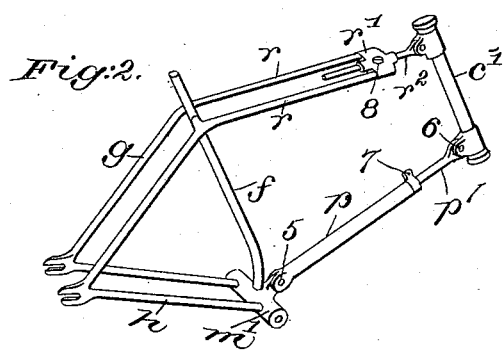
Witnesses.
Louis N. Gauell
Edward F. Allen
Inventor,
George Otis Draper.
by Crosby & Gregory
attys.
THE NORRIS PETERS CO., PHOTO-LITHO., WASHINGTON, D. C.

UNITED STATES PATENT OFFICE.

GEORGE OTIS DRAPER, OF HOPEDALE, MASSACHUSETTS.

BICYCLE.

SPECIFICATION forming part of Letters Patent No. 490,844, dated January 31, 1893.

Application filed June 9, 1892. Serial No. 436,075. (No model.)

*To all whom it may concern:*

Be it known that I, GEORGE OTIS DRAPER, of Hopedale, county of Worcester, State of Massachusetts, have invented an Improvement in Bicycles, of which the following description, in connection with the accompanying drawings, is a specification, like letters and figures on the drawings representing like parts.

Bicycles as now commonly constructed have their frame-works of several different sizes and by adjustment of the pedals, cranks, and the seat and steering parts, vertically, it is expected to suit most riders.

My invention consists essentially in a bicycle frame having a jointed telescopic backbone, and a jointed telescopic connection between the steering shaft bearing and the pedal shaft bearing, substantially as will be described.

Figure 1, in side elevation represents a bicycle embodying one form of my invention, and Fig. 2 is a modification.

The wheels $a$, $b$, the fork or steering shaft $c$, the seat $d$, the steering handle $e$, the standard or bars $f$, the braces $g$ and $h$ supporting the journal about which turns the hub of the rear-wheel, are and may be all as common in ordinary bicycles.

In my invention the back bone extended from the standard $f$, to the steering-rod or wheel-fork bearing $c'$, is made in two parts so that it may be adjusted longitudinally, and the rod connecting the said bearing $c'$ with the bearing $m'$ at the lower end of the standard $f$ in which latter bearing rotates the pedal shaft $m$, is also made adjustable.

The back bone in Fig. 1 is represented as composed of a tube $n$ jointed at 2 to ears on the upright $f$, and of a rod $n'$ jointed at 3 to ears on the bearing $c'$, the shank of the rod $n'$ fitting telescopically the tube $n$, suitable clamping devices, which may be either a split ring with a bolt or screw as 4, co-operating with the said rod and tube, the tube being split at one or more places at its end as desired thus enabling the rod and tube to be clamped together snugly in any desired adjusted position. The portion of the frame connecting the bearings $c'$ and $m'$ is also made adjustable, and as shown in Fig. 1 in substantially like manner, such connection being composed of a tube $p$, pivoted as at 5, see Fig. 2, said tube receiving in it a rod $p'$ jointed at 6 to ears on the bearing $c'$.

The parts $g$, $h$, $m'$, $p$, $p'$, $c'$ are intended to be alike in both Figs. 1 and 2. The rod $p'$ and tube $p$ may be held in adjusted position by or through any suitable clamping device as a screw 7 entering preferably ears of a split collar embracing a split portion of a tube. By loosening the screws 4 and 7 of the wheels $a$, $b$, may be placed at a greater or less distance apart, and by pushing the rod $n'$ or $p'$ more or less into the tubes $n$ and $p$, the joints referred to enabling this to be done the steering rod bearing may be inclined more or less from vertical position so as to bring the steering handle in the position required for the rider.

In Fig. 2, the back-bone is shown as composed of two small rods $r$, $r$, each jointed to the upright $f$, as described, of the tube $n$, the said small rods having a hub $r'$ provided with a suitable socket to receive the rod $r^2$ jointed to the bearing $c'$ as described of rod $n'$, a suitable crank or set screw 8 confining the rod $r^2$ in adjusted position with relation to the rod $r$.

In the different forms in which I have embodied my invention the frame-work is made telescopic between wheel centers and by the term "telescopic" I mean any form of device which will permit of adjustment longitudinally of one part of the frame-work carrying one wheel center with relation to another part of the frame-work indirectly controlling or carrying the other wheel center.

Having described my invention what I claim as new and desire to secure by Letters Patent, is:—

A bicycle-frame having a jointed telescopic back-bone, and a jointed telescopic connection between the steering-shaft bearing, and the pedal-shaft bearing, substantially as described.

In testimony whereof I have signed my name to this specification in the presence of two subscribing witnesses.

GEORGE OTIS DRAPER.

Witnesses:
E. D. BANCROFT,
S. FRED SMITH.